3,062,710
ented Nov. 6, 1962

3,062,710
TREATING COMPOSITIONS CONTAINING NI-
TROGENOUS CONDENSATION PRODUCTS
Clarence L. Moyle, Clare, and Robert L. Johnson, Midland, Mich., assignors to The Dow Chemical Company, Midland, Mich., a corporation of Delaware
No Drawing. Filed Feb. 18, 1959, Ser. No. 793,972
3 Claims. (Cl. 167—31)

This invention relates to new and improved compositions for use in coating compositions, oil and latex paint compositions and cellulosic materials to provide degradation-resistant properties.

The control of microorganisms is a persisting problem. The wide variety of organisms and the varying conditions and situations where control is necessary present particular problems which preclude a simple solution. Preservative needs are found in the textile, paper, food, wood, coatings and paint fields. For example, it is known that coating compositions are subject to bacterial and fungal attack. Many preservatives have been employed but have been found to undergo diminution in activity or reduction in killing power upon storage or standing on the shelf. This is of particular importance in paint compositions which may be subject to frequent repeated contamination by opening of containers, insertion of brushes, exposure to dust and other sources. High concentration of preservative affects the brushing and spreading characteristics of the paint compositions or otherwise confers undesirable properties to the films formed therefrom.

Films formed from coating compositions are subject to mildew collection, that is, a phenomenon of the coating or film manifest by the presence of mold or fungus growth. Such attack results in eventual failure of paint or varnish film brought about by consumption of oil components or change in chemical composition of paint constituents by the microorganisms, pH change due to metabolic by-product formation, or discoloration by accumulation of mycelia and spores thereon. Furthermore, such growth frequently works under the film through abrasions and cracks producing deterioration of the structures underneath. Many fungicidal agents which have been suggested for inclusion in oil paints and films react with oils and pigments causing discoloration or fading thereof. Others act as antioxidants and antisiccatives thereby slowing the drying rate. The protective effects produced by certain fungicidal agents are transistory since they vaporize or are otherwise dissipated out of the composition upon weathering. Certain others are decomposed by light and air.

Wood and wood products such as lumber employed in frame building constructions, poles or posts are subject to fungal attack manifest by surface growth which is followed by deterioration and loss of the wood. Many preservatives currently employed are subject to loss or inactivation on standing for long periods, particularly on exposure to high humidity or persistently damp conditions. Certain preservatives are undesirable because they bleed or crystallize (bloom) on the surfaces. Other cellulosic materials such as paper and textiles are also susceptible to microbially induced degradation. Where conditions of high humidity and temperature accelerate microbial growth, obnoxious and musty odors are frequently found to be produced.

Halophenols are widely used as preservatives because of their broad antimicrobial activity and relatively desirable properties such as low toxicity to higher animals, mild corrosiveness, relatively pleasant oder and lack of color, properties which are present to a high degree in other preservatives such as organic mercury compounds and organo sulfur compounds. However, the preservative activity is frequently inadequate, microbial growth and/or deterioration setting in, particularly if subject to weathering conditions or to standing over extended periods. Frequently a relatively large amount of preservative agent will provide adequate protective action but this preservative effectiveness is generally accompanied by impartation of undesirable properties to the material or system being treated. Furthermore, in most instances it is difficult if not impossible to reapply a preservative composition. These and similar problems have not been solved by the alternative of employing salts of halophenols. Thus, the alkali metal salts or their lower amine salts are found to have similar limitations as the halophenols themselves, frequently requiring high concentrations to obtain preservation and further have an additional limitation of increased solubility in water, rendering them useless in applications where exposure to high humidity or water may be encountered. Other salts such as lead and copper salts have limitations such as extremely low solubility rendering compounding difficult or high color as in the case of copper salts or ready reactivity with hydrogen sulfide as in the case of lead salts. Thus, it is clear that there exists a need for an antimicrobial agent that is effective at low concentration and is resistant to diminution of its antimicrobial action.

It has been discovered that a new, active antimicrobial composition may be constituted by the combination of (1) a halophenol compound and (2) a condensation product of an aliphatic alkanolamine with formaldehyde. This composition when employed for antimicrobial uses prevents the growth of microorganisms at a concentration considerably less than that required when employing either component alone. This combination of reagents is particularly valuable from the standpoint of decreasing substantially the amount of halophenol or salt thereof necessary in many compositions. The incorporation of the alkanolamine-formadlehyde condensation product in an amount of as little as 1/15 part by weight for each part by weight of halophenol provides an improved composition which affords a protective action otherwise obtained only by using two to three times as much of the halophenol compound when employed alone. This antimicrobial activity is of more lasting duration under more rigorous conditions than that obtained by use of either component alone even when employed in larger amounts. Thus, the present composition gives substantially complete protection when subjected to rigorous conditions of humidity and temperature under which conditions no protection was afforded by either halophenol compound or condensation product when employed alone. Furthermore, the new composition confers substantially no undesirable properties to the system to be treated.

By the expression "halophenol compound" as herein employed is meant halophenols as hereinafter defined and water-soluble salts thereof.

The halophenols suitable for the practice of this invention are halogenated monohydric phenols and embrace halogenated parasiticidal phenols including alkyl and phenyl substituted phenols which have been chlorinated or brominated. Halophenols of particular value in the practice of this invention are compounds defined by the structure

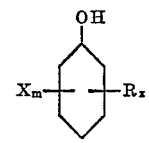

wherein R is a substituent selected from the group consisting of methyl and phenyl, each X is at least one of bromine and chlorine, $x$ is 0 or 1, and $m$ is an integer of from 1 to $(5-x)$, inclusive. Suitable halophenols are those having mixed chlorine and bromine as well as those having a single halogen species and include 2-bromo-4-chlorophenol, 2-bromo-4,6-dichlorophenol, 2,6-dibromo-4-chlorophenol, 2-chloro-4-phenylphenol, 2,3,4-trichlorophenol, 2,3,6-trichlorophenol, 2,4,5-trichlorophenol, 4-bromophenol, 2-bromophenol, 2,4-dibromophenol, 4-chloro-m-cresol, 2-chloro-4,6-dibromophenol, pentachlorophenol, pentabromophenol, 2,3,5,6-tetrachlorophenol, 2,3,4,5-tetrachlorophenol, 2,3,4,6-tetrachlorophenol, 2,3,5,6-tetrachloro-p-cresol, 2,4,5,6-tetrabromo-m-cresol, 2,4,6-trichlorophenol, 3,4-dichlorophenol, 2,3-dichlorophenol, 2,5-dichlorophenol, 2,6-dichlorophenol, 2,4-dichlorophenol, 2,3,6-tribromo-p-cresol, 2,4,6-trichloro-m-cresol, 2,4,6-tribromo-m-cresol, 4,6-dibromo-o-cresol, 2,5-dibromo-p-cresol, 3,6-dibromo-2-chloro-p-cresol, 4-chlorophenol, 3-chlorophenol, 2-chlorophenol, 2-bromo-4-phenylphenol, 4-bromo-2-phenylphenol and 4-chloro-2-phenylphenol.

When the compositions of the present invention are employed in aqueous systems or can be applied employing aqueous treating compositions, water-soluble salts of the halophenols may be employed instead of the parent halophenol. Particularly suitable are the alkali metal, ammonium and amine salts such as potassium, sodium, lithium, ethanolamine, trimethylamine, methylamine, ethylamine, isopropanolamine, triethanolamine, etc.

The alkanolamine-aldehyde condensation product employed in the practice of this invention is a product obtainable by the reaction of from about 1 to 2 molar proportions of formaldehyde with one molar proportion of an aliphatic alkanolamine having one hydroxyl radical and at least one primary amino radical and embodying a straight chain structure of at least 3 atoms of the group consisting of carbon and nitrogen, the nitrogen in said structure being attached only to carbon and hydrogen. Suitable condensation products may be obtained from the reaction of formaldehyde with an alkanolamine such as 2-(2-aminoethylamino)ethanol, 2-(2-aminoethylamino)-1-propanol, 2-aminoethanol, 1-amino-2-propanol, 1-amino-2-butanol, 3-amino-1-propanol, 2-(2-amino-1-methylethylamino)ethanol, 1,3-diamino-2-propanol or mixtures thereof.

The alkanolamine-formaldehyde condensation product may be prepared by intimately mixing the appropriate aliphatic alkanolamine and formaldehyde preferably with cooling and agitation. A reaction occurs with some evolution of heat and the formation of the desired condensation product and water of reaction. It is desirable to maintain the temperature below about 60° C. in carrying out the reaction. The preferred temperature range is from 40° to 50° C. The rate of combining the reactants is dependent upon the initial temperature and the efficiency of cooling. A non-reacting polar solvent may be employed as a reaction medium. Lower alcohols and water are suitable. The aldehyde may be employed in any form. Thus, formaldehyde may be employed as its commercially available 36–38 percent aqueous solution or as paraformaldehyde. The polyamine condensation product resulting from the reaction is a clear, viscous, colorless or light colored composition which may be somewhat gelatinous. It is miscible with water and/or polar solvents such as alcohols, glycols, glycol ethers, acetone, etc. The water or solvent may be removed at reduced pressure while maintaining the temperature below about 60° C. to obtain the product as a white or light colored anhydrous solid.

For the successful practice of this invention, it is desirable that the alkanolamine-formaldehyde condensation product prepared as above described be present in an amount of at least 1/42 by weight of the amount of halophenol employed and in many instances an amount of 1/15 by weight is satisfactory. The lower limit is based on the weight of the halophenol equivalent of the water-soluble salt when the latter is employed. The upper limit is not critical and is usually dictated by economic considerations or factors to be considered with respect to the particular system where employed. The optimum amount of the condensation product with respect to the halophenol may also vary with the particular system in which the composition of the present invention is employed as well as with the amount of halophenol compound employed. For example, in oil paint formulations, best results are obtained when the composition is employed in a ratio of halophenol to condensation product of about 6:1 to 12:1 and with a halophenol concentration in the paint formulation of about 0.75 to about 1.5 percent by weight. In aqueous systems such as latex paint compositions, the minimum amount of halophenol compound with equal or excess amount of condensation product is considered desirable.

The new composition comprising (1) a halophenol compound and (2) a condensation product of an aliphatic alkanolamine with formaldehyde as previously defined is prepared by simply mixing the components. The composition is preferably employed in a solvent. Solvents particularly useful are polar solvents or mixtures of solvents in which one component is polar such as glycol ethers, alcohols, ether alcohols, ketones or a mixture such as hydrocarbon-ketone-alcohol mixture or ether-alcohol mixture or aqueous-organic solvent mixture. The compositions may be applied by any method normally employed in the use of halophenols as antimicrobial agents. Thus, the material to be treated may be impregnated by dipping or immersion with or without pressure as in the case of wood and wood products, or may be mixed in a composition as in the case of paint and other coating compositions, or may be added in a step in its manufacture, or sprayed or brushed onto the final product. The mere application or incorporation of the composition of the present invention is sufficient to impart the desirable properties, and the effectiveness thereof does not require special after treatment-procedures such as baking.

One of the many antimicrobial applications in which the composition of the present invention has found particular usefulness is in preventing microbial growth and microbially induced degradation in films formed from both oil and water base paints. Coatings and films formed from currently marketed oil and alkyd resin paint compositions, said paint compositions containing germicidal phenols, suffer from mildew growth after exposure to normal conditions of temperature and humidity, and if employed on wood surfaces the applications are followed by microbially induced degradation of the wood itself. However, compositions of the present invention when incorporated into an oil paint and the resulting modified oil paint employed to paint soft wood panels are found to give excellent control against mildew formation of the panels when the latter are exposed to very rigorous conditions of temperature and humidity. Furthermore, the present compositions are useful for increasing the shelf life of coating compositions. Coating materials containing compositions of the present invention have been found to adequately prevent microbial growth.

Another application of the present invention is in the preservation of wood against fungus induced decay. Thus, wood impregnated with compositions of the present invention and exposed to wood inhabiting fungi in growth promoting atmosphere, after a period of time shows little or no loss in weight from decay.

Other applications include preservation of paper and other cellulosic materials. For example, paper treated with compositions of the present invention when subjected to rigorous temperature-humidity conditions show resistance to microbial attack. Furthermore, treated material, maintained for an extended period of time and subsequently subjected to rigorous temperature-humidity conditions show similar effective resistance to microbial attack.

In all such applications the degree of protection control provided by compositions of the present invention was greater than that provided by either compound alone even when employed at higher concentrations.

The following examples illustrate the invention but are not to be construed as limiting.

EXAMPLE 1

An oil paint having the composition set forth below was made by intimately blending in a conventional manner oil, varnish and pigments and adding to the resulting paste, driers, solvents and water.

|  | Lbs. |
|---|---|
| Iron oxide pigment | 1,498 |
| Amorphous silica | 888 |
| Asbestine | 1,476 |
| Spar varnish (60 percent N.V.) | 1,180 |
| Linseed oil, Q bodied | 2,888 |
| Mineral spirits | 626 |
| Water | 88 |
| Co drier (6 percent) | 28 |
| Pb drier (24 percent) | 70 |
| Mn drier (6 percent) | 11 |
|  | 8,153 |

Compositions comprising (1) 2,3,4,6-tetrachlorophenol and (2) varying aliphatic alkanolamine-formaldehyde condensation products in varying ratios were prepared as follows.

Composition 1: Weight percent
- 2,3,4,6-tetrachlorophenol --- 30
- 2-(2-aminoethylamino)-2-propanol-formaldehyde (1:1.5)[1] --- 5
- Water --- 5
- Propylene glycol monomethyl ether --- 60

In separate operations, these compositions were added to and intimately admixed with an oil paint composition above described to produce modified paint compositions containing 2,3,4,6-tetrachlorophenol at a concentration of 1 percent by weight. In other operations the same oil paint composition above described was modified by the addition of one of the components as follows: Compositions comprising 2-(2-aminoethylamino)-2-propanol-formaldehyde (1:1.5) condensation product in propylene glycol monomethyl ether, 1-amino-2-propanol-formaldehyde (1:1.5) condensation product in propylene glycol monomethyl ether, 2(2-aminoethylamino)ethanol-formaldehyde (1:1.5) in propylene glycol monomethyl ether and 2-(2-amino-1-methylethylamino)ethanol - formaldehyde (1:2) in propylene glycol monomethyl ether were added to paint to obtain modified paint compositions containing one of the condensation products at a level of 1 percent. In still other operations, the oil paint composition above described was modified by adding a treating composition of 30 percent 2,3,4,6-tetrachlorophenol in propylene glycol monomethyl ether to provide the phenol at a level of 1 percent and 3 percent.

The modified paint compositions were then applied to panels of ponderosa pine. The painted panels were allowed to dry by standing for 2 to 3 days at room temperature. A second coat was then applied and the panels allowed to dry by standing for 5 days at room temperature. After drying, the panels were placed in a tropical chamber maintained at 88° F. and 95 percent relative humidity. After four weeks, the panels were visually evaluated for the amount of mildew growth and compared with check panels painted with unmodified paint. The check panels showed very heavy mildew growth wherein the surface of the panel was completely covered. The results obtained are shown in Table I.

Table I

| Condensation product | Ratio 2,3,4,6-tetrachlorophenol/condensation product | Percent 2,3,4,6-tetrachlorophenol in paint | Percent condensation product in paint | Amount of mildew growth |
|---|---|---|---|---|
| 2-(2-aminoethylamino)-1-propanol-formaldehyde | 6:1 | 1 | 0.167 | Substantially none. |
| 1-amino-2-propanol-formaldehyde | 6:1 | 1 | 0.067 | Do. |
| 2-(2-aminoethylamino) ethanol-formaldehyde | 10:1 | 1 | 0.1 | Do. |
| 2-(2-amino-1-methylethyl-amino)ethanol-formaldehyde | 15:1 | 1 | 0.067 | Do. |
| 2-(2-aminoethylamino)-1-propanol-formaldehyde |  |  | 1.0 | Very heavy. |
| 1-amino-2-propanol-formaldehyde |  |  | 1.0 | Do. |
| 2,(2-aminoethylamino)ethanol-formaldehyde |  |  | 1.0 | Do. |
| 2-(2-amino-1-methylethylamino)ethanol-formaldehyde |  |  | 1.0 | Do. |
| None |  | 1.0 |  | Heavy. |
| Do |  | 3.0 |  | Moderate. |

Composition 2: Weight percent
- 2,3,4,6-tetrachlorophenol --- 30
- 1-amino-2-propanol-formaldehyde (1:1.5)[1] --- 5
- Water --- 5.6
- Propylene glycol monomethyl ether --- 59.4

Composition 3:
- 2,3,4,6-tetrachlorophenol --- 30
- 2-(2-aminoethylamino) ethanol-formaldehyde (1:1.5)[1] --- 3
- Water --- 3
- Propylene glycol monomethyl ether --- 64

Composition 4:
- 2,3,4,6-tetrachlorophenol --- 30
- 2-(2-amino-1-methylethylamino)ethanol-formaldehyde (1:2)[1] --- 2
- Water --- 2
- Propylene glycol monomethyl ether --- 66

[1] Figures in parentheses in above and in subsequent examples represent moles of alkanolamine and formaldehyde, respectively, employed in the preparation of the condensation product.

EXAMPLE 2

In similar operations various compositions comprising (1) halophenol and (2) alkanolamine-formaldehyde condensation product were prepared in propylene glycol monomethyl ether with or without added water. These compositions were similar to those described in Example 1, and contained 30 percent by weight of the halophenol. The compositions were incorporated into paint having the composition described in Example 1 to provide modified paint compositions containing 1 percent by weight of halophenol. In other operations, oil paint having the composition previously described was modified with compositions of halophenol in propylene glycol monomethyl ether or alkanolamineformaldehyde condensation product in water in an amount sufficient to provide 1 percent by weight of halophenol or condensation product. Wood panels were painted with modified paint compositions as well as unmodified paint compositions and dried, exposed to conditions of the tropical chamber for three weeks as described in Example 1 and then examined visually for mildew growth. The results are given in Table II.

Table II

| Halophenol | Percent by weight | Condensation product (alkanolamine-formaldehyde) | Percent by weight | Ratio halophenol/ condensation product | Control of mildew growth |
|---|---|---|---|---|---|
| 2,3,4,6-tetrachlorophenol | 1.0 | 2-(2-aminoethylamino) ethanol-formaldehyde (1:1.5) | 0.083 | 12:1 | Good. |
| Do | 1.0 | ----do---- | 0.25 | 4:1 | Do. |
| 2-chloro-4-phenylphenol | 1.0 | ----do---- | 0.083 | 12:1 | Excellent. |
| Do | 1.0 | ----do---- | 0.1 | 10:1 | Good. |
| 2-chloro-4,6-dibromophenol | 1.0 | ----do---- | 0.167 | 6:1 | Excellent. |
| 2,4,5-trichlorophenol | 1.0 | ----do---- | 0.167 | 6:1 | Good. |
|  |  | ----do---- | 1.0 |  | None. |
| Pentachlorophenol | 1.0 | 2-(2-aminoethylamino)-1-propanol-formaldehyde (1:1.5) | 0.167 | 6:1 | Good. |
| Do | 1.0 | ----do---- | 0.067 | 15:1 | Excellent. |
| 2-chloro-4-phenylphenol | 1.0 | ----do---- | 0.25 | 4:1 | Do. |
| 2,3,4,6-tetrachlorophenol | 1.0 | ----do---- | 0.1 | 10:1 | Good. |
| Tetrachlorocresol [1] | 1.0 | ----do---- | 0.25 | 4:1 | Do. |
| 2-chloro-4,6-dibromophenol | 1.0 | ----do---- | 0.1 | 10:1 | Do. |
|  |  | ----do---- | 1.0 |  | None. |
| Pentachlorophenol | 1.0 | 2-aminoethanol-formaldehyde (1:1) | 0.1 | 10:1 | Excellent. |
| p-Bromophenol | 1.0 | ----do---- | 0.1 | 10:1 | Do. |
|  |  | ----do---- | 1.0 |  | None. |
| 2,4,5-trichlorophenol | 1.0 | 1-amino-2-propanol-formaldehyde (1:1.5) | 0.067 | 15:1 | Good. |
| 2-chloro-4,6-dibromophenol | 1.0 | ----do---- | 0.167 | 6:1 | Excellent. |
|  |  | ----do---- | 1.0 |  | None. |
| 2-chloro-4-phenylphenol | 1.0 | 3-amino-1-propanol-formaldehyde (1:1.5) | 0.067 | 12:1 | Excellent. |
| 2,4,5-trichlorophenol | 1.0 | ----do---- | 0.25 | 4:1 | Good. |
|  |  | ----do---- | 1.0 |  | None. |
| 2-chloro-4-phenylphenol | 1.0 | 1-amino-2-butanol-formaldehyde (1:1.5) | 0.1 | 10:1 | Excellent. |
|  |  | ----do---- | 1.0 |  | None. |
| 2,3,4,6-tetrachlorophenol | 1.0 | 1-amino-2-butanol-formaldehyde (1:1) | 0.25 | 4:1 | Good. |
|  |  | ----do---- | 1.0 |  | None. |
| Pentachlorophenol | 1.0 | 2-(2-amino-1-methylethyl-amino)ethanol-formaldehyde (1:2) | 0.25 | 4:1 | Excellent. |
|  |  | ----do---- | 1.0 |  | None. |

[1] 59 percent tetrachloro-m-cresol, 22 percent tetrachloro-p-cresol, 15 percent tetrachloro-o-cresol.

EXAMPLE 3

In an operation carried out in a manner similar to that described in Examples 1 and 2, compositions comprising (1) 2,3,4,6-tetrachlorophenol and (2) a condensation product of 1 mole of 1,3-diamino-2-propanol with 2 moles of formaldehyde were prepared in propylene glycol monomethyl ether with 30 percent by weight of 2,3,4,6-tetrachlorophenol and varying ratios of condensation product to the phenol. These compositions were employed to produce modified oil paint compositions containing 2,3,4,6-tetrachlorophenol at a concentration of 1 percent by weight as previously described. The modified paint as well as unmodified paint were applied to the surfaces of wood panels and the panels dried and exposed in a tropical chamber as previously described. The time of exposure in this operation was four weeks. The results observed on examination are given in Table III.

Table III

| Ratio of halophenol/condensation product | Control of mildew growth |
|---|---|
| 4:1 | Excellent. |
| 2:1 | Do. |
| 6:1 | Do. |
| Check | None. |

EXAMPLE 4

A treating composition having the following composition is prepared:

|  | Weight percent |
|---|---|
| 2,3,4,6-tetrachlorophenol | 30 |
| 2-(2 - amino-1-methylethylamino) ethanol-formaldehyde (1:1.5) | 3 |
| Propylene glycol monomethyl ether | 67 |

The above composition is intimately admixed with an oil paint having the composition set forth in Example 1 to provide modified oil paint compositions containing the above composition in varying concentrations. Other samples of oil paint or modified with a 30 percent solution of 2,3,4,6 - tetrachlorophenol in propylene glycol monomethyl ether or with a 30 percent solution of 2-(2-amino-1-methylethylamino)ethanol-formaldehyde condensation product in propylene glycol monomethyl ether in varying concentrations. The modified oil paint samples are as follows:

| Paint sample No. | Concentration of 2,3,4,6-tetrachlorophenol in weight percent | Concentration of condensation products in weight percent |
|---|---|---|
| 1 | 0.75 | 0.075 |
| 2 | 1.0 | 0.1 |
| 3 | 1.5 | 0.15 |
| 4 | 1.0 | 0.0 |
| 5 | 3.0 | 0.0 |
| 6 | 0.0 | 1.0 |

The modified oil paint samples as well as unmodified paint are applied to panels of ponderosa pine and placed in a tropical chamber as described in Example 1. The panels are examined visually at the end of one week and at the end of four weeks. At the end of one week, panels painted with samples 1, 2, 3 and 5 show no mildew growth. Panels painted with samples 4, 6 and unmodified paint show mildew growth. At the end of four weeks, panels painted with samples 1, 2 and 3 show no mildew growth, panels painted with sample 5 show moderate mildew growth and panels painted with samples 4, 6 and unmodified paint show heavy mildew growth.

EXAMPLE 5

Compositions comprising varying ratios of (1) pentachlorophenol and (2) a condensation product of one mole of alkanolamine and 1.5 moles of formaldehyde are prepared in a glycol ether solvent (a commercial solvent mixture of propylene glycol monomethyl ether, dipropylene glycol monomethyl ether and tripropylene glycol monomethyl ether) as follows:

COMPOSITION 1.—PENTACHLOROPHENOL+2 - (2 - AMINO)-1-PROPANOL-FORMALDEHYDE (1:1.5) CONDENSATION PRODUCT IN RATIO OF 3:1

|  | Weight percent |
|---|---|
| Condensation product | 6.7 |
| Pentachlorophenol | 20 |
| Glycol ether solvent | 73.3 |

COMPOSITION 2.—PENTACHLOROPHENOL+2-AMINO-1-BUTANOL-FORMALDEHYDE (1:1.5) CONDENSATION PRODUCT IN RATIO OF 2:1

|  | Weight percent |
|---|---|
| Condensation product | 10 |
| Pentachlorophenol | 20 |
| Glycol ether solvent | 70 |

In separate operations, the above compositions as well as a composition of pentachlorophenol in the glycol ether solvent and a control sample of the glycol ether solvent alone are incorporated in latex paint samples to produce modified latex paint compositions.

The latex paint employed for this operation is made by intimately blending a pigment dispersion having the composition:

| Component: | Parts by weight |
|---|---|
| Titanium dioxide | 250 |
| Clay | 50 |
| Calcium carbonate | 50 |
| Diatomaceous earth | 25 |
| Potassium tripolyphosphate | 1.5 |
| Water | 270 | with a 48 percent solids content synthetic latex composition comprising a copolymer of 60 percent styrene and 40 percent butadiene.

One hundred gram samples of modified latex paint compositions are inoculated with 0.5 milliliter of a 24 hour culture of a mixture of organisms consisting largely of *Pseudomonas, Aerobacter* and *Proteus* species previouly isolated from spoiled samples of α-protein, latex or latex paint. The inoculated samples are incubated for 24 hours at 37° C. and then streaked on nutrient agar plates, the streaked plates incubated at 37° C. and the plates examined visually for microbial growth at the end of 72 hours. The plates streaked with paint samples modified with a composition comprising (1) pentachlorophenol and (2) a condensation product of an aliphatic alkanolamine and formaldehyde show no microbial growth whereas plates streaked with paint samples modified with pentachlorophenol or condensation product alone or modified paint show microbial growth.

EXAMPLE 6

In an operation similar to that described in Example 5, but wherein the condensation product is present in excess, a treating composition is prepared as follows.

COMPOSITION 3.—PENTACHLOROPHENOL+2-(2-AMINOETHYLAMINO)-1-PROPANOL-FORMALDEHYDE CONDENSATION PRODUCT IN RATIO OF 1:4

| | Weight percent |
|---|---|
| Condensation product | 20 |
| Pentachlorophenol | 5 |
| Glycol ether solvent | 70 |

The above composition is incorporated in latex paint to produce modified latex paint compositions and the latter as well as unmodified latex paint samples are inoculated, incubated, streaked and incubated as previously described. On examination at the end of 72 hours, the plates streaked with modified latex paint show no microbial growth whereas plates streaked with the unmodified paint show prolific microbial growth.

EXAMPLE 7

In an operation similar to that described in Example 5, a treating composition is prepared wherein the halophenol is employed in the form of a water-soluble salt. The ratio of halophenol salt to condensation product is 1:2. The treating composition is prepared by mixing the following components.

| | Weight percent |
|---|---|
| 1,3-diamino-2-propanol-formaldehyde (1:2) condensation product | 28.6 |
| Sodium pentachlorophenoxide | 14.3 |
| Methanol | 16.2 |
| Water | 40.9 |

The composition is incorporated into latex paint described in Example 4 to produce modified paint compositions in an amount sufficient to provide 0.1 percent by weight of sodium pentachlorophenoxide. Other latex paint samples are modified by the addition of either sodium pentachlorophenoxide or 1,3-diamino-2-propanol-formaldehyde condensation product at levels of 0.2 percent and 0.1 percent, respectively. The modified latex paint compositions as well as unmodified latex paint compositions are inoculated, incubated, streaked on plates and the latter incubated as previously described and observed at the end of 72 hours. The plates streaked with paint compositions modified with the treating compositions show no microbial growth whereas plates streaked with paint compositions modified with sodium pentachlorophenoxide or 1,3-diamino-2-propanol-formaldehyde condensation product alone show prolific microbial growth.

EXAMPLE 8

A concentrate composition having the following components is prepared.

| Component: | Weight percent |
|---|---|
| Pentachlorophenol | 10 |
| 1,2-diamino-2-propanol-formaldehyde (1:2) | 5 |
| Propylene glycol monomethyl ether | 85 |

The above composition as well as compositions comprising (A) pentachlorophenol in propylene glycol monomethyl ether and (B) 1,3-diamino-2-propanol-formaldehyde condensation product in propylene glycol monomethyl ether are prepared. The above compositions as well as the solvent, propylene glycol monomethyl ether, are employed to treat blocks of southern yellow pine.

Wood blocks of about 0.4 cubic inch in volume are carefully weighed and impregnated with the treating solution. The impregnation is carried out by placing the blocks under about 5 millimeters' pressure, adding the treating agent thereon, then releasing the vaccum and allowing the blocks to remain immersed at atmospheric pressure for 20 to 30 minutes. The impregnated blocks are blotted dry and conditioned by maintaining at 70° F. and 50 percent relative humidity until a constant weight is obtained. The blocks are then placed in covered decay chambers holding soil containing an actively growing pure culture of *Lenzites trabea* and incubated at 80° F. for a period of 11 weeks. At the end of this period, the blocks are removed, any loose soil or fungus growth brushed off, conditioned to a constant weight and weighed. It is found that the wood blocks treated with a composition comprising pentachlorophenol and 1,3-diamino-2-propanol-formaldehyde condensation product show less than 5 percent loss in weight whereas blocks treated with pentachlorophenol alone, condensation product alone or solvent alone show a loss of from 40 to 60 percent in weight of the blocks.

This is a continuation-in-part of our copending application Serial No. 716,558, filed February 21, 1958, now abandoned.

We claim:

1. A composition comprising (1) a halophenol compound selected from (*a*) the group consisting of halophenol, halo-cresol and halo-phenylphenol and (*b*) water-soluble salts of (*a*), wherein in said halophenol compound, halo is selected from the group consisting of chloro and bromo and numbers from 1 to 5, inclusive; and (2) a condensation product of from about 1 to 2 molar proportions of formaldehyde with one molar proportion of an aliphatic alkanlamine, said aliphatic alkanolamine containing from 2 to 5 carbon atoms, inclusive, and characterized by having one hydroxyl radical, at least one primary amino radical and embodying a straight chain structure of at least 3 atoms of the group consisting of carbon and nitrogen, the nitrogen in said structure being attached only to carbon and hydrogen, wherein said condensation product is obtained by mixing together said aliphatic alkanolamine and formaldehyde at a temperature below about 60° C.; and wherein in said composition, the condensation product is present in an amount of from about $\frac{1}{15}$ the amount to about 4 times the amount of halophenol equivalent of the halophenol compound when based on weight.

2. A composition comprising (1) a halophenol compound, said halophenol compound being selected from the group consisting of (a) halophenols having the structure

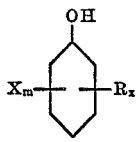

wherein R is a substituent selected from the group consisting of methyl and phenyl, each X is at least one of bromine and chlorine, x is selected from 0 and 1, and m is an integer of from 1 to (5—x), inclusive, and (b) water-soluble salts of said halophenols; and (2) a condensation product of from about 1 to 2 molar proportions of formaldehyde with one molar proportion of an aliphatic alkanolamine containing from 2 to 5 carbon atoms, inclusive, and characterized by having one hydroxyl radical and at least one primary amino radical and embodying a straight chain structure of at least 3 atoms of the group consisting of carbon and nitrogen, the nitrogen in said structure being attached only to carbon and hydrogen, wherein said condensation product is obtained by mixing together said aliphatic alkanolamine and formaldehyde at a temperature below about 60° C.; and wherein in said composition, the condensation product is present in an amount of from about $\frac{1}{15}$ the amount to about 4 times the amount of halophenol when based on weight.

3. A composition comprising (1) a chlorophenol compound, said chlorophenol compound being selected from the group consisting of (a) chlorophenols having the structure

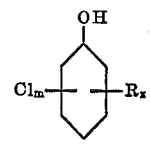

wherein R is selected from the group consisting of methyl and phenyl, x is selected from 0 and 1, and m is an integer of from 1 to (5—x), inclusive, and (b) water-soluble salts of said chlorophenols; and (2) a condensation product of from about 1 to 2 molar proportions of formaldehyde with one molar proportion of an aliphatic alkanolamine containing from 2 to 5 carbon atoms, inclusive, and characterized by having one hydroxyl radical and at least one primary amino radical and embodying a straight chain structure of at least 3 atoms of the group consisting of carbon and nitrogen, the nitrogen in said structure being attached only to carbon and hydrogen, wherein said condensation product is obtained by mixing together said aliphatic alkanolamine and formaldehyde at a temperature below about 60° C.; and wherein in said composition, the ratio of said chlorophenol to said condensation product is from about 15:1 to about 1:4.

References Cited in the file of this patent
UNITED STATES PATENTS 2,201,762     Cupery _____ May 21, 1940
2,823,234     Tousignant _____ Feb. 11, 1958

UNITED STATES PATENT OFFICE
CERTIFICATE OF CORRECTION

Patent No. 3,062,710                                        November 6, 1962

Clarence L. Moyle et al.

It is hereby certified that error appears in the above numbered patent requiring correction and that the said Letters Patent should read as corrected below.

Column 8, lines 63 and 64, for "AMINO)-1-PROPANOL-FORMALDEHYDE (1:1.5)" read -- AMINOETHYLAMINO)-1-PROPANOL FORMALDEHYDE (1:1.5) --.

Signed and sealed this 18th day of June 1963.

(SEAL)
Attest:

ERNEST W. SWIDER                               DAVID L. LADD
Attesting Officer                                 Commissioner of Patents